(12) United States Patent
Hegemann et al.

(10) Patent No.: US 9,159,235 B2
(45) Date of Patent: Oct. 13, 2015

(54) METHOD OF OPERATING A DRIVER ASSISTANCE SYSTEM OF A MOTOR VEHICLE

(71) Applicant: Conti Temic microelectronic GmbH, Nuremberg (DE)

(72) Inventors: Stefan Hegemann, Wangen (DE); Tobias Stephan, Wasserburg (DE); Marc Fischer, Nonnenhorn (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 35 days.

(21) Appl. No.: 14/196,027

(22) Filed: Mar. 4, 2014

(65) Prior Publication Data

US 2014/0249722 A1 Sep. 4, 2014

(30) Foreign Application Priority Data

Mar. 4, 2013 (DE) .......................... 10 2013 102 087

(51) Int. Cl.
*G06F 7/00* (2006.01)
*G06F 17/10* (2006.01)
*G08G 1/16* (2006.01)

(52) U.S. Cl.
CPC .................. *G08G 1/16* (2013.01); *G08G 1/166* (2013.01); *G08G 1/167* (2013.01); *G06F 7/00* (2013.01)

(58) Field of Classification Search
CPC ......... G08G 1/16; G08G 1/166; G08G 1/167; G06F 7/00
USPC ........................... 701/1, 41, 93, 300, 301, 302
See application file for complete search history.

(56) References Cited

U.S. PATENT DOCUMENTS

| | | | |
|---|---|---|---|
| 4,670,845 A | 6/1987 | Etoh | |
| 4,706,195 A | 11/1987 | Yoshino et al. | |
| 5,053,979 A | 10/1991 | Etoh | |
| 5,166,881 A | 11/1992 | Akasu | |
| 5,197,562 A | 3/1993 | Kakinami et al. | |
| 5,335,743 A | 8/1994 | Gillbrand et al. | |
| 5,695,020 A | 12/1997 | Nishimura | |
| 5,745,870 A | 4/1998 | Yamamoto et al. | |

(Continued)

FOREIGN PATENT DOCUMENTS

| | | |
|---|---|---|
| DE | 32 22 263 | 2/1983 |
| DE | 198 21 163 | 11/1999 |

(Continued)

*Primary Examiner* — Calvin Cheung
*Assistant Examiner* — Angelina Shudy
(74) *Attorney, Agent, or Firm* — W. F. Fasse (57) ABSTRACT

A driver assistance system includes a sensor that detects objects and/or characteristics of objects in the surroundings of a motor vehicle, and an object recognition unit that evaluates data from the sensor to produce object information, and determines a confidence value indicating the probability of accuracy thereof. If the confidence value is greater than a minimum threshold but less than a predefined threshold, then the system displays the object information to the driver, who confirms or rejects it, e.g. by actuating or not actuating an operating element. Upon confirmation by the driver, the system begins or continues to perform a driver assistance function based on the object information. Upon rejection by the driver, the system does not perform or discontinues the driver assistance function based on the object information. If the confidence value exceeds the predefined threshold, then the system autonomously performs the driver assistance function.

19 Claims, 2 Drawing Sheets

(56) References Cited

U.S. PATENT DOCUMENTS

| | | | |
|---|---|---|---|
| 5,767,466 A | 6/1998 | Durrani | |
| 5,771,481 A | 6/1998 | Gilling | |
| 5,969,969 A | 10/1999 | Ejiri et al. | |
| 6,246,949 B1 | 6/2001 | Shirai et al. | |
| 6,324,463 B1 | 11/2001 | Patel | |
| 6,370,471 B1 | 4/2002 | Lohner et al. | |
| 6,373,472 B1 | 4/2002 | Palalau et al. | |
| 6,438,491 B1 | 8/2002 | Farmer | |
| 6,491,216 B1* | 12/2002 | May | 235/375 |
| 6,554,090 B1 | 4/2003 | Kuroda et al. | |
| 6,624,747 B1* | 9/2003 | Friederich et al. | 340/436 |
| 6,945,346 B2 | 9/2005 | Massen | |
| 2002/0183929 A1* | 12/2002 | Tsuji et al. | 701/301 |
| 2003/0168271 A1 | 9/2003 | Massen | |
| 2003/0217880 A1* | 11/2003 | Isogai et al. | 180/170 |
| 2009/0055095 A1* | 2/2009 | Urban et al. | 701/301 |
| 2011/0211071 A1* | 9/2011 | Kuehnle et al. | 348/149 |
| 2012/0169526 A1* | 7/2012 | Reilhac | 342/70 |
| 2012/0303258 A1* | 11/2012 | Pampus et al. | 701/301 |
| 2013/0223686 A1* | 8/2013 | Shimizu et al. | 382/103 |
| 2014/0244142 A1* | 8/2014 | Matsubara | 701/116 |
| 2015/0025787 A1* | 1/2015 | Lehner et al. | 701/301 |
| 2015/0081187 A1* | 3/2015 | Solyom et al. | 701/70 |
| 2015/0109118 A1* | 4/2015 | Urano et al. | 340/435 |

FOREIGN PATENT DOCUMENTS

| | | |
|---|---|---|
| DE | 198 51 434 | 5/2000 |
| DE | 100 48 102 | 4/2002 |
| DE | 102006027554 | 1/2008 |
| DE | 102008002576 | 12/2009 |

\* cited by examiner

METHOD OF OPERATING A DRIVER ASSISTANCE SYSTEM OF A MOTOR VEHICLE

PRIORITY CLAIM

This application is based on and claims the priority under 35 USC 119 of German Patent Application 10 2013 102 087.9, filed on Mar. 4, 2013, the entire disclosure of which is incorporated herein by reference.

FIELD OF THE INVENTION

The invention relates to a method of operating a driver assistance system of a motor vehicle that provides or performs at least one driver assistance function autonomously or semi-autonomously, such as a braking control, steering control, or acceleration control, for example. In the method, surroundings sensors of the driver assistance system detect objects and/or object characteristics within a detection area covered by the sensors. A confidence value is assigned to the objects and/or object characteristics, to indicate the probability of the actual presence of the detected object and/or the probability of the proper allocation of the object characteristic to the recognized object.

BACKGROUND INFORMATION

Present-day motor vehicle technology includes several different types of known driver assistance systems, such as Adaptive Cruise Control (ACC) systems that can autonomously or semi-autonomously control the acceleration and braking functions of a motor vehicle to follow a leading vehicle that travels ahead of the subject or ego vehicle. The typical behavior of such driver assistance systems includes a relatively small occurrence rate of erroneous reactions or omitted reactions to other traffic participants (such as other motor vehicles or pedestrians) or obstacles in the environment around the subject vehicle. With the increasing automation of the driving of motor vehicles, the proper detection and monitoring of other traffic participants, and avoiding the oversight or missing of such other traffic participants, are becoming especially more critical. Because the proper tuning or coordination of such systems involves a balancing between a reliable recognition (availability) and avoidance of erroneous reactions, this balanced tuning must favor the reliable recognition of objects especially in connection with automated or semi-automated driving in order to achieve greater safety and reliability. This, however, necessarily leads to an increased rate of erroneous reactions of the systems in borderline or marginal situations.

In present-day driver assistance systems, the monitoring and correction of erroneous reactions of the system is at least partially up to the human driver of the vehicle. For example, such systems allow the driver to override erroneous system reactions (for example an automated braking of the subject vehicle based on another vehicle that is driving ahead in a neighboring lane rather than the subject vehicle's own lane), by stepping on the gas pedal during the time of the erroneous system reaction (e.g. the erroneous automated braking). However, such "overpowering" of the automated or semi-automated control by the driver assistance system for the duration of the automated control occurrence is typically regarded as interfering and uncomfortable by the driver. Thus, it would be desirable to reduce such erroneous system reactions, or to simplify the driver's monitoring of the system reactions and/or to shorten the duration of the driver's overriding measures and/or to reduce the effort required of the driver's overriding measures.

A general method of the type mentioned above in the field of relevant art is known from the German Patent Publication DE 10 2008 002 576 A1, in which a sensor system locates objects and a driver assistance system calculates at least one plausibility measure (confidence value, reliability) on the basis of the location data thereof, for establishing the plausibility of the detected object data. Particularly, the plausibility value indicates the existence probability of the object and/or the probability of correct applicability of a particular object characteristic. In order to decide as to the existence of the object or the applicability of the object characteristic, a threshold value function is applied to the plausibility value. Thus, for example, all objects are regarded as real if their respective plausibility values lie above the threshold value of the threshold value function.

It has been found, however, that in this known method, erroneous system reactions of a driver assistance system are not avoided in all traffic situations, and therefore such erroneous system reactions must again be overpowered or overridden by the driver.

The German Patent Publication DE 100 48 102 A1 discloses a driver assistance system for supporting and relieving burden from a driver of a motor vehicle, in which the driver is included in the control in rarely occurring driving situations in the context of an ACC driver assistance system in traffic following operation, in that the relative target objects to be utilized for the speed regulation in the following operation are selected among the detected target objects dependent on their speed and dependent on the driver's manual operation of an operating element arranged in the vehicle. Particularly in this regard, target objects that are moving and classified as relevant target objects among the detected target objects are automatically used for the speed regulation, whereas stationary target objects are selected for the speed regulation only upon request by the vehicle driver, namely by the driver's operation of the operating element arranged in the vehicle. Thereby the system effectiveness of the driver assistance system shall be significantly improved and simultaneously the trust or confidence of the driver in the speed regulation all the way to a complete standstill of the vehicle is increased. However, erroneous system reactions cannot be avoided even in this known driver assistance system.

Furthermore, the German Patent Publication DE 10 2006 027 554 A1 discloses a vehicle with an ACC driver assistance system with which the speed of the vehicle is regulated and a motor or a braking system is activated dependent on a desired nominal value of acceleration. In such an ACC driver assistance system, the maximum achievable positive and negative acceleration values are limited. These limits can only be released or exceeded by an overriding by means of the driver's operation of the driving pedal (e.g. accelerator pedal) or the brake pedal, whereby however the driver assistance system is deactivated and thereafter must again be switched on. This is regarded as inconvenient and disadvantageous.

In order to give the driver of the vehicle a comfortable and simply operable possibility for correcting erroneous or interfering driving behaviors of the driver assistance system, this German Patent Publication DE 10 2006 027 554 A1 proposes to provide for the driver an operating element that communicates with the driver assistance system. Upon the driver's actuation of the operating element, at least one signal is produced, so that during the operation of the operating element, the driver assistance system changes the desired nominal acceleration value dependent on the signal produced by the operation of the operating element, and the motor and/or the brake system of the vehicle is actuated dependent on the changed desired nominal acceleration value.

Thereby a comfortably operable driver assistance system is presumably achieved, but even this known driver assistance system has the disadvantage, that upon the occurrence of erroneous system reactions the vehicle driver must still override such system reactions. Thereby, of course, the availability of such a driver assistance system is disadvantageously reduced.

SUMMARY OF THE INVENTION

In view of the above, it is an object of embodiments of the present invention to provide a method of operating a driver assistance system of a motor vehicle, with which the availability of driver assistance functions of the driver assistance system is increased. It is a further object of embodiments of the invention to improve the driver's comfort as well as the driver's trust or confidence in the driver assistance system. Another object of embodiments of the invention is to simplify the driver's interaction with the driver assistance system while still enabling the driver to monitor or be involved in at least some control decisions of the driver assistance system. Still another object of embodiments of the invention is to improve the reliability and reduce the occurrence rate of erroneous reactions of the driver assistance system by involving the driver in control decisions involving a lower degree of certainty by the automated system, yet carrying out automatic control decisions for which the automated system has a higher degree of certainty. Embodiments of the invention further aim to avoid or overcome the disadvantages of the prior art, and to achieve additional advantages, as apparent from the present specification. The attainment of these objects is, however, not a required limitation of the claimed invention.

The above objects can be achieved by embodiments of the invention in a method of operating a driver assistance system of a motor vehicle that carries out at least one driver assistance function, which may be any driver assistance function of any driver assistance system of a motor vehicle that is presently known or developed in the future. Such functions autonomously or semi-autonomously control one or more aspects of the operation of the motor vehicle, such as controlling the braking, acceleration, and/or steering. Alternatively or additionally, the driver assistance functions may involve supporting the driver in manually carrying out the operation of the vehicle (or a combination of the driver's manual control and semi-autonomous control by the driver assistance system), for example the system may inform or warn the driver about road conditions, the course or path of the driving lane on the roadway, obstacles in the driving path, the presence, location, driving speed and/or driving direction of other vehicles, etc. Preferably, the driver assistance system includes at least one surroundings or environment sensor that detects objects in a detection zone or area in the environment around the subject motor vehicle. The driver assistance system determines a confidence value associated with a respective detected object and/or at least one object characteristic of a respective detected and recognized object. The object characteristics may be, for example, the type of object, the distance, speed and/or direction of the object relative to the subject vehicle, the location of the object relative to the subject vehicle, the size and/or shape of the object, or other characteristics that can be determined for or allocated to a respective detected and recognized object. The confidence value indicates the probability of the actual existence or presence of the detected object and/or the probability of the proper allocation of the object characteristic to the recognized object. For example, the confidence value indicates the degree of certainty or confidence in the automatic evaluation of the object. In general, the detected object and/or the object characteristics of a recognized object are referred to as the object information, so that a confidence value is allocated to the object information (whereby the object information may comprise an identification of one or more detected objects and/or one or more object characteristics allocated to one or more recognized objects in the detection area of one or more surroundings sensors of the driver assistance system).

In a preferred embodiment of the invention, the confidence value is used to determine whether a driver intervention or driver confirmation is needed in the automatic operation of a driver assistance function. The confidence value is compared with a prescribed threshold value. If the confidence value falls below the prescribed threshold value, then a driver information is produced as an output, e.g. generated, emitted, displayed, indicated, or otherwise communicated to the driver of the vehicle. Preferably, the driver information is produced and displayed by an indicator or display unit so that the driver information is perceived by the driver. The driver information comprises the abovementioned object information, namely the informations about the detected object and/or the at least one object characteristic of the recognized object, and may comprise additional information. The driver assistance system further includes an input device, e.g. an operating element or operating arrangement that can be actuated or operated by the vehicle driver so as to selectively confirm (or not confirm) the object information, i.e. the detected object and/or the at least one object characteristic. The input device, generally referred to herein as an operating element or operating arrangement, is a component of the driver assistance system and/or of the motor vehicle, and it can comprise any device, arrangement, component or element that can be selectively actuated by the vehicle driver to provide an input, for example by means of a button, a knob, a lever, a switch, a slider, a scroll wheel, a touchscreen, a joystick, a hand gesture detected by a camera or other sensor, a voice recognition system using a microphone and audio processor, or any combination of such elements. If the driver confirms the object information in this manner, then the driver assistance system carries out a driver assistance function on the basis of the confirmed object information or continues to perform the driver assistance function if this function had already been commenced. On the other hand, according to a further embodiment feature, if the driver does not confirm the object information indicated in the driver information, then the driver assistance system does not perform or stops the driver assistance function.

With such a method according to an embodiment of the invention, by including the driver, i.e. a driver input, into the decision-making of the driver assistance system, and by requesting or requiring the driver to provide a reply in the manner of a confirmation or non-confirmation, thereby a short temporary limitation of the availability of the system is bridged over, and the reliability of the system is improved. Furthermore, such a system in a further embodiment uses the driver input in a self-learning manner in that the informations gathered through successive driver inputs (confirmations or non-confirmations) with respect to various detected objects or object characteristics of recognized objects are recorded and used to improve the future availability, reliability and accuracy of the driver assistance system, because the system improves its future object evaluation based on the driver inputs with respect to previous object informations.

With an activated driver assistance system, a continuous system behavior is thereby realized in that when the confidence value sinks below the prescribed threshold value, the system does not automatically and immediately stop the driver assistance function, but instead the driver is then included in the decision making to determine whether the driver assistance function shall be further performed or shall be stopped on the basis of the available object information (e.g. the object or the associated object characteristic) which has the below-threshold confidence value allocated thereto.

A further advantage is achieved by a method according to this embodiment of the invention in that the driver is kept at a high attention level due to the incorporation of the driver's input into the regulation loop of the driver assistance system. Thereby, such a driver assistance system and the associated method can also be used for fatigue or drowsiness detection and warning, because if the driver continuously fails to operate the operating element over a prescribed time period it can be assumed that the driver is "nodding off" or falling into "micro sleep" for at least brief intervals, or is inattentive due to fatigue.

According to a further especially advantageous embodiment of the invention, when the confidence value falls below the prescribed threshold, the at least one driver assistance function is started right away (shortly before, shortly after, or simultaneously) with producing the driver information output. Namely, to avoid any delay or any loss of time in the system reaction in critical traffic situations, the driver assistance function is already commenced even before receiving the decision input by the driver indicating whether the presented object information has been confirmed or not confirmed. Thereafter, depending on the decision (confirmation or non-confirmation) of the driver, the already-commenced driver assistance function is then further continued or is stopped.

In another advantageous embodiment of the invention it is provided that upon a non-actuation of the operating element the driver assistance function offered to the driver via the driver information is not performed or an already-commenced driver assistance function is stopped. Upon the non-actuation or non-operation of the operating element it is assumed that the selection and confirmation of a detected object or of object characteristics of a recognized object that is offered with the displayed driver information, would lead to an erroneous system reaction of the driver assistance system, which thus can be prevented preemptively or quickly thereafter. Thereby, especially the functional reliability or security of the driver assistance system is significantly improved.

It is further advantageous according to another embodiment of the invention, if the driver information is produced only if the confidence value exceeds (or at least reaches) a prescribed minimum value. Thereby an instability in the functional behavior of the driver assistance system is prevented, and the driver is not excessively bothered to confirm or reject very-low-confidence object information. Very-low-confidence object information is ignored or screened out.

In another preferred embodiment of the invention, the driver information comprises several object characteristics of a recognized object, and by actuating or operating the operating element the driver can confirm a selected one of the object characteristics offered with the driver information. Thereby the driver takes over the decision which one of the offered object characteristics corresponds to reality, i.e. which one of the object characteristics is correct. When the driver assistance system uses this information in a self-learning system, thereby the recognition rate of the driver assistance system is further improved.

According to a further advantageous embodiment of the invention, the driver assistance system is embodied as a lane recognition system and the driver information indicates the detected course or path of the lane. Upon actuation of the operating element by the driver, the driver assistance system takes up the detected lane course as a recognized lane course in the driver assistance function. Advantageously in such a case in which a confidence value falling below the prescribed threshold value is determined for the lane course as the detected object, for example due to a missing lane marking, nonetheless this detected lane course is taken up as the actual lane course by the driver assistance system upon actuation of the operating element by the driver, which indicates the driver's confirmation of the correct lane course.

It is especially advantageous according to a further development of the invention if the driver information includes the driver assistance function that is proposed or provided on the basis of the detected object or object characteristic. Thereby the driver can decide whether this offered driver assistance function represents a proper or an erroneous system reaction, and the driver can accordingly confirm the proper offered driver assistance function by actuating the operating element, or decline/reject the erroneous offered driver assistance function by not actuating the operating element. Throughout this process, the driver assistance system remains active, so that the driver assistance system does not need to be newly activated after such a rejection by the driver of the offered assistance function.

Thus, according to another further development of the invention it is provided that the driver assistance system is embodied as an Adaptive Cruise Control (ACC) driver assistance system with an object following regulation or control, whereby the driver information comprises an object information regarding an object detected in the driving lane of the subject vehicle, and the system indicates or displays as the offered driver assistance function a speed regulation following after this detected object. Thus, upon actuation of the operating element by the driver, the driver assistance system then performs a following control of the subject vehicle's speed to properly follow the detected object (e.g. a leading vehicle driving ahead of the subject vehicle in the same traffic lane). Thereby, the input (or non-input) by the driver quickly determines or clarifies whether a weakly detected leading object (and thus an object for which the object recognition of the ACC driver assistance system determined a confidence value falling below the prescribed threshold) is suitable and shall be used as a target for the following control.

In another advantageous further development according to an embodiment of the invention it is provided that the driver assistance system is also embodied as an ACC system and carries out a following control to follow a recognized leading object ahead of the subject vehicle in the same traffic lane. When the system (e.g. a sensor such as a radar sensor of the system) detects a new detected object ahead of the subject vehicle, then the driver information indicates the new detected object and offers to switch the following control to follow the new detected object as the new driver assistance function. Upon actuation of the operating element by the driver, the system performs a switch or change of the following control to the new detected object as the target to be followed. In this embodiment it is thus also quickly clarified whether, for example, another vehicle driving in the adjacent traffic lane but very close to one's own traffic lane should now be used as the new object to be followed by the ACC system.

According to another advantageous embodiment of the invention, the ACC driver assistance system is embodied with a lane following control, wherein the displayed driver information indicates the detected lane course or path. Upon actuation of the operating element by the driver, the driver assistance system performs the lane following control as the driver assistance function. Upon non-actuation of the operating element by the driver, then the driver assistance system as a driver assistance function performs a discontinuation of the lane following control. Thereby, the driver input serves to prevent an erroneous system reaction even in an ACC driver assistance system with a lane following control.

As already mentioned above, a method according to an embodiment of the invention can also be used for fatigue or drowsiness detection or warning, in that if the driver does not actuate the operating element at all during a prescribed time duration, then the system emits a warning (e.g. visual, acoustic and/or haptic warning) to the driver so as to alert or arouse the driver, and the system is further preferably switched to a safe state or safe condition, for example in which the system discontinues a following control, decelerates the vehicle, and/or steers the vehicle to a stop at a roadside or breakdown lane, or in which the driver assistance system simply disengages or switches to an initial condition, or controls the vehicle according to certain specified safety parameters.

BRIEF DESCRIPTION OF THE DRAWINGS

In order that the invention may be clearly understood, it will now be described in further detail in connection with example embodiments thereof, with reference to the accompanying drawings, wherein.

DETAILED DESCRIPTION OF EXAMPLE EMBODIMENTS AND THE BEST MODE OF THE INVENTION

First Example Embodiment

A vehicle, for example a motor vehicle, is equipped with an Adaptive Cruise Control (ACC) driver assistance system, which includes one or more surroundings sensors, for example such as a radar sensor, and a processing circuit comprising an object recognition arrangement or object recognition circuit including an image processor, a further data processor or other electronic circuit elements (e.g. comparators) for evaluating data received from the one or more surroundings sensors, a data storage memory, and other elements conventionally included in a driver assistance system. The surroundings sensors may be any types of sensors, e.g. radar sensors and/or video cameras, used in ACC systems. The object recognition arrangement or unit may be any such arrangement used for object recognition in any known ACC system. The at least one surroundings sensor detects objects in the surroundings of the subject motor vehicle, for example objects on the roadway and especially in the traffic lane of the subject vehicle. The at least one sensor then provides corresponding sensor data to the object recognition unit, which evaluates the sensor data to attempt to recognize the objects detected by the sensor. On this basis, the ACC driver assistance system then further performs a method as represented in FIG. 1 for selectively carrying out a driver assistance function such as a following control of the subject vehicle to follow a suitable leading target object such as another vehicle leading ahead of the subject vehicle in the traffic lane of the subject vehicle.

Figure 1:
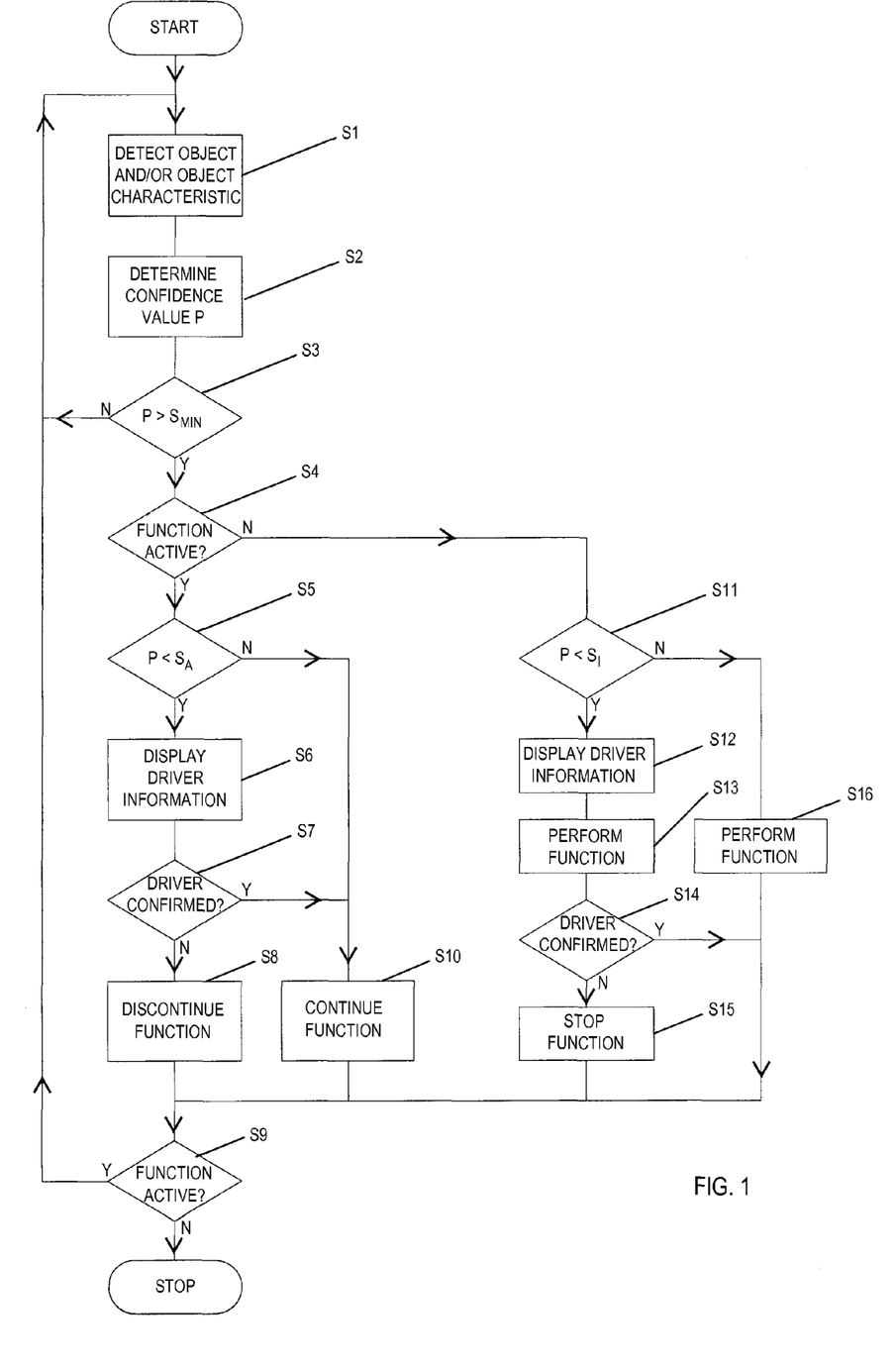
FIG. 1 is a schematic flow diagram for explaining a first embodiment and a second embodiment of a method according to the invention.

As shown in FIG. 1, after starting the method for operating this ACC driver assistance system, in a method step S1 an object is detected in the traffic lane of the subject vehicle, and in a subsequent step S2 the system determines a confidence value P for the detected object. The confidence value P indicates the degree of certainty or the probability that the detected object actually exists in the real world in the traffic lane ahead of the subject vehicle. Furthermore, additionally or alternatively, the system determines one or more characteristics of an object that has been recognized, and the respective confidence value P indicates the degree of certainty or the probability that this respective characteristic is properly determined and allocated to the object. These determinations of confidence can be performed in any known manner according to any known system for determining confidence values. The recognition of objects and the confidence thereof can be determined, for example, by comparing and matching the actual detected sensor data with stored data patterns or images, and the confidence value can indicate the degree to which the actual sensor data matches a given stored data pattern or image.

The method continues in method step S3, in which the confidence value P is compared with a minimum threshold value $S_{MIN}$. If the confidence value P exceeds the minimum threshold value $S_{MIN}$, then it is tested in method step S4 whether a respective driver assistance function is already being performed, e.g. has already previously been activated (e.g. in a previous measuring cycle). If the ACC driver assistance function is already being carried out with respect to this object recognized as a leading target object to be followed in the method step S1, then a subsequent step S5 involves comparing the confidence value P to a further active threshold value $S_A$. If the confidence value P does not fall below the active threshold value $S_A$ (e.g. if P is equal to or greater than $S_A$) then the method step S5 is followed by a further step S10 in which the object is further recognized as a proper leading target object to be followed and thus the assistance function comprising the following control to follow this recognized object is continued. Thereafter, the method progresses to a method step S9, which determines whether the driver assistance function is activated (i.e. being performed). If so, then the method flow returns to method step S1 (e.g. for another measuring cycle).

Considering the opposite case in step S5, namely if the confidence value P falls below the active threshold value $S_A$, then the method progresses to step S6 whereby a display or indicator unit of the motor vehicle outputs a driver information to indicate to the vehicle driver that a following control is being performed to follow this detected object. Thereupon the driver may interact or communicate with the ACC driver assistance system via an operating element such as a button, switch, slider, lever, touchscreen, joystick or other operating element or arrangement provided in the motor vehicle. Namely, by actuating the operating element the driver may confirm the following control to follow the detected object as the driver assistance function. Alternatively, the driver may decline or reject this driver assistance function through non-actuation of the operating element. It should be understood that the opposite confirmation and non-confirmation can also be carried out within the scope of the present invention, namely indicating confirmation through non-actuation of the operating element, and indicating rejection or non-confirmation through actuation of the operating element. The subsequent method step S7 checks the input status, e.g. the result of the driver's confirmation or non-confirmation. Namely, if the driver confirms the following control based on the detected object by actuating the operating element, then the method proceeds to the abovementioned step S10 in which the driver assistance function comprising the following control based on the detected object as the recognized object is further continued. Thereafter, as also mentioned above, the method progresses via step S9 through a return loop back to method step S1.

On the other hand, if in step S7 the driver has not confirmed the following control based on the recognized object, e.g. the driver has not actuated the operating element, then the driver assistance function comprising the following control is stopped or discontinued in step S8, and then through the determination in the subsequent step S9 the method ends.

Now considering the opposite outcome case in the abovementioned step S4, namely that the driver assistance function is not already being performed, then the method proceeds to a step S11 in which the abovementioned confidence value P determined for the object detected and recognized in method step S1 is compared with a prescribed inactive threshold value $S_I$. If the confidence value P exceeds (or is equal to) the inactive threshold value $S_I$, then the method proceeds from step S11 to a step S16 by which the ACC following control is performed as the driver assistance function. Then the method flow proceeds via the abovementioned evaluation step S9 back to the first step S1.

For the opposite case in step S11, namely if the confidence value P is less than the inactive threshold value $S_I$, then the method proceeds from step S11 to a subsequent step S12 in which a driver information is output via an indicator or display device of the motor vehicle, to indicate to the driver that a following control based on this detected object can be confirmed or rejected. However, in order not to loose any time or cause delay in the operation, the driver assistance system in a step S13 immediately begins the ACC following control as a driver assistance function. The step S13 may commence before, after or simultaneously with the step S12. The method also waits (e.g. for a prescribed time interval) for an input of the driver, namely in a subsequent step S14 the system checks the input status, e.g. it is determined whether the driver has entered into communication with the ACC driver assistance system by actuation of the operating element. Namely, it is determined whether the driver has confirmed the propriety and desired continuation of this driver assistance function comprising the following control to follow the detected object, which the driver confirms by actuating the operating element. Alternatively, the driver declines or rejects this driver assistance function by not actuating the operating element. Thus, if step S14 determines that the driver has confirmed the offered following control based on the recognized object, then the ACC following control is further continued as the driver assistance function. Accordingly, the process flow continues via method step S9 and a return loop back to the first method step S1. In the other case, namely if it is determined in step S14 that the driver has not confirmed the following control, i.e. has not actuated the operating element (e.g. during the prescribed time interval) and thus has declined or rejected the ACC following control as the driver assistance function, then this function is stopped according to method step S15. In this case, the process flow goes to the step S9 where it is determined that the function is not activated, and thus the method ends.

As explained above, based on the driver information indicated or displayed in the method step S6 or the method step S12, the driver can either confirm the indicated driver assistance function by actuating the operating element, or can decline, reject or stop the driver assistance function by not actuating the operating element (e.g. during a prescribed time interval). Alternatively, the operation of the operating element and/or the driver information can be embodied oppositely, to provide the driver the possibility to decline, reject or stop the driver assistance function by actuating the operating element, and to confirm and approve the driver assistance function by not actuating the operating element. For example, in such an opposite embodiment, the non-confirmation or rejection of the offered or initiated driver assistance function in steps S7 or S14 involves actuating the operating element so as to stop the function, namely by actuating the operating element the driver indicates to the driver assistance system that the already commenced driver assistance function shall be terminated, or the offered but not yet commenced driver assistance function shall not be performed.

Because the system requests confirmatory input from the driver when the system is less certain of its evaluation, thereby the overall accuracy and reliability of the system is improved and its availability is increased, because the system can also actuate a driver assistance function (such as a following control) based on an object that the ACC system can only weakly or unclearly recognize or of which the position can only be unclearly determined. Namely, for such objects or their characteristics (such as the position, speed, etc.) the confidence value P will be relatively low, and for example will fall below the respective active system threshold value $S_A$ or inactive system threshold value $S_I$. Thus, where the driver assistance system is insufficiently certain of its evaluation, it requests the confirmation of the driver so that the system can then perform the driver assistance function based on this object if the propriety thereof is confirmed by the driver.

Generally, the threshold value for the active system is lower or less than the threshold value for the inactive system, i.e. $S_A < S_I$. Namely, if the driver assistance function is already active then it can be continued with a lower confidence value before triggering a request for the driver's confirmatory input. In other words, for an already-active assistance function, it can be continued with a lower confidence value than would be required for beginning a new assistance function. On the other hand, if the driver assistance function is not already active but instead a new function is to be activated, a higher threshold of certainty is needed to avoid confirmation by the driver. For example, with a continuous driver assistance function a confidence value of about 95% is used for an accurate recognition of a detected object, and for continuing this following control it is acceptable for this confidence value to diminish to about 80%, for example. Namely, the active system threshold value $S_A$ would be set at about 80% for example. On the other hand, if the driver assistance function is not already being performed, a greater value is selected for the inactive system threshold value $S_I$, for example 90% or 95%, to begin the new assistance function. As a result, overall, thereby a hysteresis-like behavior is achieved with respect to the production or generation of driver information.

In the above described example embodiment, the confidence value is determined for the existence of an object. This method is also suitable to determine the confidence value of detected object characteristics of a recognized object. For example, in the context of an ACC driver assistance system, a confidence value can be determined for whether a recognized object is a pedestrian, a bicycle rider, an automobile, a truck, or some other type of object. Thereby, the driver information comprising the object information that is indicated or displayed in the method step S6 offers the driver a particular object characteristic to be confirmed or selected by appropriate actuation of the operating element. Namely, the possibility also exists to have the driver select an appropriate one among plural offered object characteristics. For example, the driver can confirm or not confirm (and thus decline) the following control based on the bicycle rider or the automobile. Furthermore, these various object characteristics can be displayed or indicated in the driver information so that the driver can select and thereby accordingly confirm the correct object characteristic for performing the driver assistance function, or decline the incorrect object characteristic whereupon the driver assistance function is then stopped or not carried out according to the method flow diagram described above.

In the first example embodiment described above, and in other embodiments according to the invention, the display or indicator unit for displaying or indicating the driver information to the driver of the vehicle may comprise an LED and/or LCD display screen (e.g. embodied as a touch screen) mounted on the vehicle dashboard, instrument panel, steering wheel, or the like, or may comprise a heads-up display of information projected onto the windshield or another display screen, or may comprise a video display screen with additional information superimposed on a camera image, or may comprise indicator lights, or may comprise an audio information output, or a combination of any such devices, for example. The operating element or arrangement may comprise any input device by which the driver can make a yes/no input, or simply a confirmatory input (whereby no actuation of the operating element means a rejection or non-confirmation), or by which the driver may select one or more objects, object characteristics, other information items, or other options among several displayed items of driver information as indicated on the display or indicator unit. Various embodiments of such input devices as well as various embodiments of display or indicator units are known in the art and are suitable for use in embodiments of the present invention.

Second Example Embodiment

A second example embodiment of an inventive method corresponds to the first example embodiment in that a motor vehicle is equipped with an ACC driver assistance system, which uses one or more surroundings sensors, such as a radar sensor for example, to detect objects in a detection zone or area of the sensor(s) such as objects in the traffic or driving lane of the subject vehicle, and includes an object recognition unit to evaluate sensor data provided by the sensor(s) based on the detected objects in the detection area. The ACC driver assistance system then performs a following control so that the subject vehicle follows a leading target object according to the method described above with reference to FIG. 1. In the present second example embodiment it is assumed as a starting point, that a first target object has already been detected and recognized for carrying out a following control to follow the first target object.

Then after starting the method, in a method step S1 a second object is detected in the traffic lane of the subject vehicle. The ACC system may detect such a second object, for example, when the subject vehicle is traveling in dense and/or slow-moving traffic and another vehicle in a neighboring lane moves close to the lane of the subject vehicle and somewhat ahead of the subject vehicle, so that the ACC system detects and evaluates such a neighboring vehicle as a potential unclearly detected object in front of the subject vehicle on the subject vehicle's own lane. For this reason, the ACC system will ask the driver for confirmation whether the following control should be switched from the existing first target object to this newly detected potential second target object. This is especially true if the ACC system has an insufficiently high certainty or confidence about whether the newly detected second object is a valid target object to be followed.

Following the step S1, in a subsequent step S2 the system determines a confidence value P for the detected second object. The confidence value P indicates the degree of certainty or the probability that the detected second object actually exists in the real world in the traffic lane ahead of the subject vehicle. Furthermore, additionally or alternatively, the system determines one or more characteristics of the second object that has been recognized, and the respective confidence value P indicates the degree of certainty or the probability that this respective characteristic is properly determined and allocated to the second object.

The method continues in method step S3, in which the confidence value P is compared with a minimum threshold value $S_{MIN}$. If the confidence value P exceeds the minimum threshold value $S_{MIN}$, then it is tested in method step S4 whether a respective driver assistance function is already being performed based on the first object, e.g. has already previously been activated (e.g. in a previous measuring cycle) for the previously detected first object. If the ACC driver assistance function is already being carried out with respect to the first object, then a subsequent step S5 involves comparing the confidence value P of the second object to a further active threshold value $S_A$. If the confidence value P does not fall below the active threshold value $S_A$ (e.g. if P is equal to or greater than $S_A$) then the method step S5 is followed by a further step S10 in which the second object is recognized as the proper leading target object to be followed and thus the following control is switched to follow the second object instead of the first object.

Considering the opposite case in step S5, namely if the confidence value P of the second object falls below the active threshold value $S_A$, then the method progresses to step S6 whereby a display or indicator unit of the motor vehicle outputs a driver information to query the driver whether the following control should be switched from the previously recognized first object to the new recognized second object, as a new driver assistance function. Thereupon the driver may actuate the operating element to confirm switching the following control to follow the detected second object instead of the previous first object, as the new driver assistance function. Alternatively, the driver may decline or reject this new driver assistance function through non-actuation of the operating element. The subsequent method step S7 checks the input status, e.g. the result of the driver's confirmation or non-confirmation. Namely, if the driver confirms switching the following control to the new second object by actuating the operating element, then the method proceeds to the step S10 in which a switch of the following control to the detected second object is carried out. On the other hand, if in step S7 the driver has not confirmed the offered switch of the following control, then the subsequent step S8 will not perform a switch of the object following control, but instead the method proceeds through the determination in the subsequent step S9 back to the initial step S1 in which the following control is continued based on the previously detected first object.

Now considering the opposite outcome case in the above-mentioned step S4, namely that the driver assistance function is not already being performed, then the method proceeds to a step S11 in which the abovementioned confidence value P determined for the object detected and recognized in method step S1 is compared with a prescribed inactive threshold value $S_I$. If the confidence value P exceeds (or is equal to) the inactive threshold value $S_I$, then the method proceeds from step S11 to a step S16 by which the ACC following control to follow the detected second object is performed as the driver assistance function. Then the method flow proceeds via the abovementioned evaluation step S9 back to the first step S1.

For the opposite case in step S11, namely if the confidence value P is less than the inactive threshold value $S_I$, then the method proceeds from step S11 to a subsequent step S12 in which a driver information is output via an indicator or display device of the motor vehicle, to indicate to the driver the possibility of performing a following control based on this detected second object. However, in order not to loose any time or cause delay in the operation, the driver assistance system in a step S13 immediately begins the ACC following control as a driver assistance function. The step S13 may commence before, after or simultaneously with the step S12. The method also waits (e.g. for a prescribed time interval) for an input of the driver, namely in a subsequent step S14 the system checks the input status, e.g. it is determined whether the driver has entered into communication with the ACC driver assistance system by actuation of the operating element. Namely, it is determined whether the driver has confirmed the propriety and desired continuation of this driver assistance function comprising the following control to follow the detected second object, which the driver confirms by actuating the operating element. Alternatively, the driver declines or rejects this driver assistance function by not actuating the operating element. Thus, if step S14 determines that the driver has confirmed the offered following control based on the recognized second object, then this ACC following control is further continued as the driver assistance function. Accordingly, the process flow continues via method step S9 and a return loop back to the first method step S1. In the other case, namely if it is determined in step S14 that the driver has not confirmed the following control, i.e. has not actuated the operating element (e.g. during the prescribed time interval) and thus has declined or rejected the ACC following control based on the second object as the driver assistance function, then this function is stopped according to method step S15. In this case, the process flow goes to the step S9 where it is determined that the function is not activated, and thus the method ends.

As explained above, based on the driver information indicated or displayed in the method step S6 or the method step S12, the driver can either confirm the indicated driver assistance function by actuating the operating element, or can decline, reject or stop the driver assistance function by not actuating the operating element (e.g. during a prescribed time interval). Alternatively, the operation of the operating element and/or the driver information can be embodied oppositely, to provide the driver the possibility to decline, reject or stop the driver assistance function by actuating the operating element, and to confirm and approve the driver assistance function by not actuating the operating element, in the steps S7 or S14. For example, in such an opposite embodiment, the non-confirmation or rejection of the offered or initiated driver assistance function in steps S7 or S14 involves actuating the operating element so as to stop the function, namely by actuating the operating element the driver indicates to the driver assistance system that the already commenced driver assistance function shall be terminated, or the offered but not yet commenced driver assistance function shall not be performed.

Third Example Embodiment

In a third example embodiment of the invention, a motor vehicle comprises a driver assistance system with a lane detection and recognition function. Such a driver assistance system can be embodied in an ACC system which can perform not only a target object following control but also a lane following control. The lane recognition can also be used for emitting a warning when the vehicle departs from its own lane (Lane Departure Warning), or for a driver assistance function to aid the driver in keeping the vehicle in its own lane (Lane Keeping Assistant), or for assisting the driver in changing lanes (Lane Changing Assistant). Various such assistant systems and the components necessary for carrying out such assistance functions are known, and can be suitably incorporated in a system for carrying out the method as disclosed herein.

For detecting and recognizing a traffic lane on the roadway, such a driver assistance system includes one or more surroundings sensors, for example including a video camera, which detect various objects such as lane markings and produce corresponding image data. The driver assistance system further includes an object recognition unit that evaluates and classifies the image data provided by the surroundings sensor(s). A method according to a third example embodiment of the invention, for operating such a driver assistance system will be explained in further detail with reference to FIG. 2.

Figure 2:
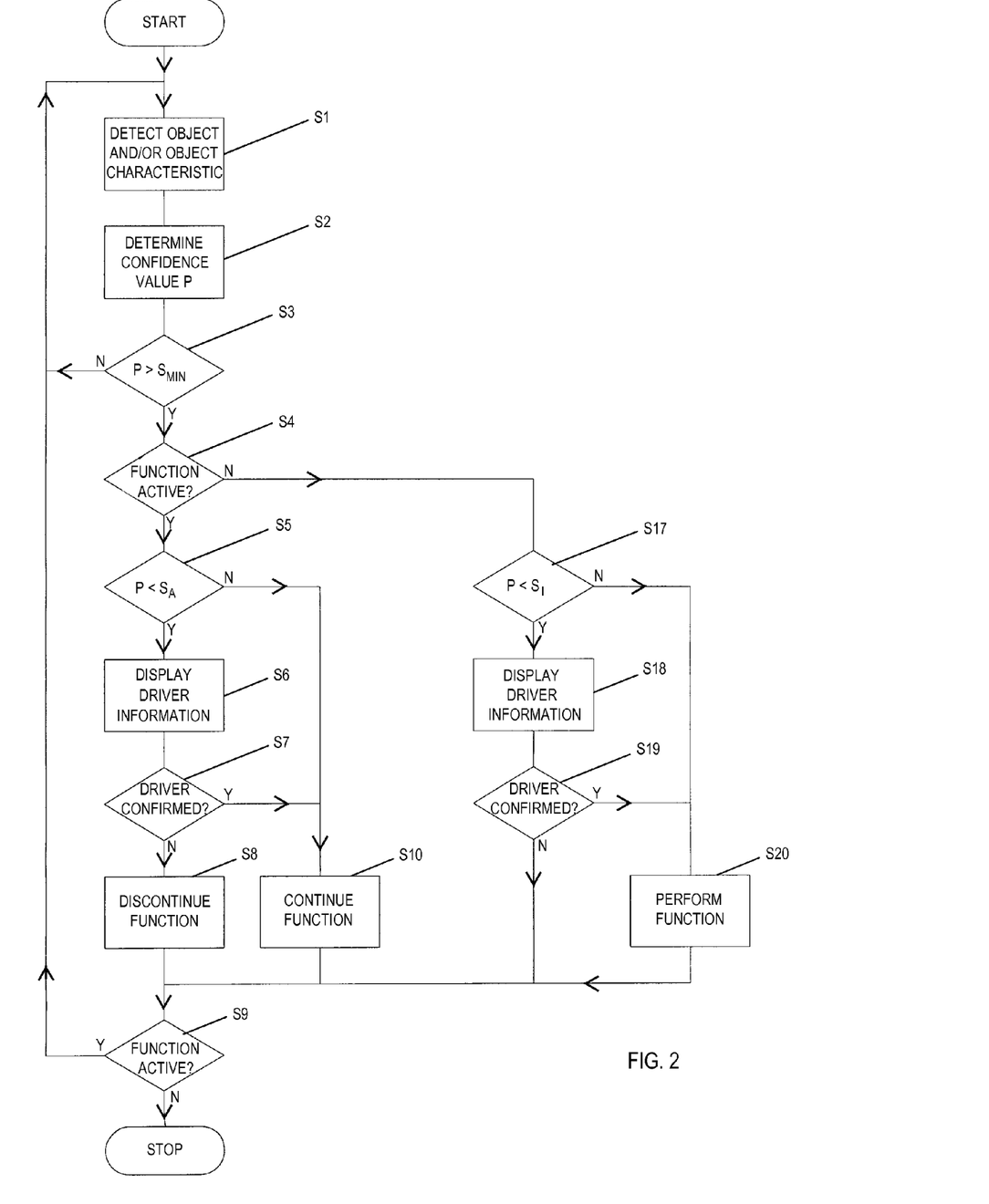
FIG. 2 is a schematic flow diagram for explaining a third embodiment of a method according to the invention.

After the start of the method, a method step S1 involves detecting the course or path of a lane as an object or generally as object information, and in a following method step S2 the confidence value P thereof is determined in the object recognition unit. The confidence value represents the degree of certainty or probability that the lane course has been correctly and accurately recognized. This probability or degree of certainty varies depending on what objects or features in the surrounding environment have been detected as indicating the course of the lane, and how clearly and unambiguously those objects or features were detected and can be recognized. For example, if clear lane markings exist on the pavement of the road, then an evaluation and recognition of the lane and its course can be achieved with relatively high confidence. On the other hand, if roadway lane markings do not exist, and the lane detection is based only on detecting the edge of the roadway along a grass border, then the confidence value will be relatively lower.

Thus, in a method step S3, it is determined whether the assigned confidence value P exceeds a minimum threshold value $S_{MIN}$. If not, then the method returns via a return loop back to the first method step S1, to hopefully obtain better object detection information in a subsequent measuring cycle. On the other hand, if a sufficiently high confidence exists, i.e. if the confidence value P is greater than the minimum threshold value $S_{MIN}$, then the method proceeds to a following step S4 in which it is determined whether a driver assistance function is already being performed.

If step S4 determines that a driver assistance function is already being performed, then a subsequent method step S5 compares the confidence value P with an associated active system threshold value $S_A$. If the confidence value P exceeds (or at least equals) this threshold value $S_A$, then according to step S10 this detected lane course is taken up and provided to the driver assistance system for carrying out one or more corresponding driver assistance functions based on this detected lane course. Thereafter, the method loops back to the first method step S1 via the step S9.

On the other hand at step S5, if the confidence value P is less than the associated active system threshold value $S_A$, then the method proceeds to a step S6 wherein a corresponding driver information is produced, indicated or displayed by means of an optical display unit of the vehicle. For example, this driver information includes a representation of the detected lane course, for example in the form of a graphic image or representation of the detected lane course or the road course superimposed on or incorporated in a video image of the roadway ahead of the vehicle.

Then, in a step S7, the system requests or checks for confirmation from the driver by checking the input status. Namely, the driver can communicate with the driver assistance system via an operating element by actuating the operating element to indicate to the driver assistance system that this displayed travel lane course corresponds to the correct real travel lane course and thus should be taken up by the system for carrying out the driver assistance function. Thus, if in step S7 the driver confirms the indicated travel lane course by actuating the operating element, then this travel lane course is taken up as a properly recognized object and then according to step S10 the driver assistance system, e.g. an ACC system, continues or performs a lane following control on the basis of this confirmed travel lane course, or a different driver assistance function is carried out or continued based on this travel lane course by the driver assistance system.

On the other hand, if in step S7 the driver did not confirm the indicated or displayed travel lane course by actuating the operating element, then the following control (in the case of an ACC system) or the lateral steering control (in the case of a Lane Keeping Assistant system) is interrupted and discontinued, i.e. the driver assistance function is stopped, with the result that the driver must take over this function. Thus, at this time, the method ends via the method step S9.

Now considering the opposite outcome in method step S4, namely that no driver assistance function is already being performed, then the method proceeds to a step S17 in which the confidence value P is compared with an associated inactive system threshold value $S_I$. As in the first example embodiment described above, the active and inactive system threshold values follow the relationship $S_A < S_I$, namely the threshold value for a system that is already active is lower than the threshold value that applies when the system is inactive.

If the confidence value P exceeds (or at least equals) the inactive threshold value $S_I$ in step S17, then this detected lane course is taken up and used by the driver assistance system according to the step S20 for carrying out a corresponding driver assistance function or functions. Thereafter, the method returns via the method step S9 back to the first method step S1.

On the other hand at step S17, if the confidence value P is less than the associated active system threshold value $S_I$, then the method proceeds to a step S18 wherein a corresponding driver information is produced, indicated or displayed by means of an optical display unit of the vehicle. For example, this driver information includes a representation of the detected lane course, for example in the form of a graphic image or representation of the detected lane course or the road course superimposed on or incorporated in a video image of the roadway ahead of the vehicle.

Then, in a step S19, the system requests or checks for confirmation from the driver by checking the input status. Namely, the driver can communicate with the driver assistance system via an operating element by actuating the operating element to indicate to the driver assistance system that this displayed travel lane course corresponds to the correct real travel lane course and thus should be taken up by the system for carrying out the driver assistance function. Thus, if in step S19 the driver confirms the indicated travel lane course by actuating the operating element, then this travel lane course is taken up as a properly recognized object and then according to step S20 the driver assistance system, e.g. an ACC system, continues or performs a lane following control on the basis of this confirmed travel lane course, or a different driver assistance function is carried out or continued based on this travel lane course by the driver assistance system.

On the other hand, if in step S19 the driver did not confirm the indicated or displayed travel lane course by actuating the operating element, then no driver assistance function is carried out. Thus, at this time, the method ends via the method step S9.

As explained above, based on the driver information indicated or displayed in the method step S6 or S18, the driver can either confirm the indicated driver assistance function by actuating the operating element, or can decline, reject or stop the driver assistance function by not actuating the operating element (e.g. during a prescribed time interval). Alternatively, the operation of the operating element and/or the driver information can be embodied oppositely, to provide the driver the possibility to decline, reject or stop the driver assistance function by actuating the operating element, and to confirm and approve the driver assistance function by not actuating the operating element, in the steps S7 or S19. For example, in such an opposite embodiment, the non-confirmation or rejection of the offered or initiated driver assistance function in steps S7 or S19 involves actuating the operating element so as to stop the function, namely by actuating the operating element the driver indicates to the driver assistance system that the already commenced driver assistance function shall be terminated, or the offered but not yet commenced driver assistance function shall not be performed.

As mentioned above, different degrees of confidence or certainty of the detection, evaluation and recognition of the lane course can result depending on the existence, clarity and unambiguity of various features or objects in the surrounding environment by which the system attempts to detect and recognize the lane course. A lane course as a detected object with a relatively low confidence value lying below the respective applicable threshold value $S_A$ or $S_I$ arises, for example, if there are no lane markings on the roadway to expressly mark the lane course, and/or the system attempts to detect the lane based on detecting the roadway edge with a grass border.

Instead of (or in addition to) determining a confidence value for the existence of a detected lane marking as an object, a confidence value may be determined for object characteristics of such an object. For example, the surroundings sensor (e.g. video camera) in cooperation with the object recognition unit of the driver assistance system may detect and recognize any one or more of the following features as a lane marking: a solid continuous line marking the edge of the roadway, an interrupted line marking the edge of the lane or of the roadway, a soft shoulder at the edge of the roadway, and/or a grass shoulder or grass border along the edge of the roadway. Thus, the driver information indicated to the driver can include various such object characteristics defining the various different features of the roadway (e.g. as mentioned above), which the driver may respectively individually select and thereby confirm or not confirm. Namely, the driver can select one or more of the offered objects or object characteristics to confirm them as correct, or leave one or more objects or object characteristics unselected so as to decline or reject them. Thus, the driver can thereby select and confirm the correct or best lane marking among the various different lane marking options, and thereby confirm which one of these lane markings should be used as the confirmed detected object as the basis for performing the driver assistance function.

The determination and allocation of a confidence value P for a detected object as used in various embodiments of the inventive method as disclosed herein, can be carried out in any manner that is known in the art or developed in the future. The details of the determination and allocation of the confidence value therefore do not need to be described in detail herein, because such details are known to a person skilled in the art. For example, the confidence value P can be determined on the basis of the frequency of the detection or the detection duration of the detection with which a respective given object is detected in subsequent measuring cycles. The detection intensity with which the object is detected by means of a sensor (e.g. a radar sensor) can also be used for determining the confidence value. Finally, the evaluated plausibility of the physical behavior of the detected object based on detected data indicating the spacing distance, the speed, and or the angle of the object relative to the subject vehicle can be used for determining the confidence value P, for example by comparing such detected data to stored plausible or realistic values or value ranges for such data.

The input device, e.g. the operating element or operating arrangement in various example embodiments as disclosed herein can be realized or embodied in a simple manner, for example as a push button or switch on the steering wheel or on a steering column lever of the vehicle. Alternatively, the operating element or arrangement can comprise any known configuration of a button, switch, knob, slider, finger turning scroll wheel, touch screen, joystick, track ball, or any other input device by which the driver may make a manual input selection or indication. As a further alternative, the operating arrangement may include a microphone and an audio processor circuit in an acoustic interface, by means of which the driver may give spoken commands to confirm or reject the objects or measures offered in the driver information.

As generally described above, the method according to the invention can be embodied or carried out so that the driver declines or rejects one or more objects or measures offered in the driver information by not actuating the operating element during a prescribed short duration of time after the driver information is displayed or otherwise indicated on the display or indicator device. Namely, if no actuation of the operating element occurs during the short time duration following display of the driver information, then the system takes this as a rejection or non-confirmation of the offered object or measure. Alternatively, it is possible to carry out the inventive method in that the operating element has the opposite function. Namely, in order to decline or reject an object or measure offered with the driver information, the driver must actively actuate the operating element. In such an embodiment, a non-actuation of the operating element during a short time duration after display of the driver information is taken as a confirmation of the offered object or measure. In a further alternative embodiment, the driver must make an active actuation of the operating element both for confirming as well as for declining or rejecting an object or measure offered in a displayed driver information. For example, to carry out such an embodiment, the operating element can be constructed or embodied as a two-stage switch or even a three-stage switch that includes a "yes" position and a "no" position and optionally a further "neutral" position.

One advantage of the method according to the invention as explained in connection with example embodiments herein is especially that the availability of the driver assistance function, as well as the reliability of the operation of the driver assistance system, are significantly increased by requesting input from the driver especially in situations where the automatic evaluation by the driver assistance system is less certain. The driver inputs confirming or rejecting proposed objects, measures or options offered in the driver information by the driver assistance system can usually be obtained in a short time, so that this causes little or no delay in beginning or continuing the offered driver assistance function. Especially for detected objects with a relatively low confidence value, the use of targeted, preemptive or anticipatory requests for such driver input lead to an increase of the availability of the driver assistance function. By using or relying on the driver's determination to confirm or reject the system's automated determination in difficult and thus low-confidence situations, the driver assistance system is able to provide the respective driver assistance function not only in the easy-to-determine high confidence situations but also in such difficult low-confidence situations. The system can also record the driver's input to fine-tune or improve the system's future automatic determinations in a self-learning manner.

Finally, the method according to an embodiment of the invention can also be used for fatigue or drowsiness recognition or fatigue or drowsiness warning. Namely, if there is no actuation of the operating element by the driver over a prescribed duration of time, the system evaluates this as a lack of attention by the driver which indicates possible fatigue or drowsiness. Thus, in such a case the system emits a warning to alert and arouse the driver, and the driver assistance system is also switched into a safe state.

Although the invention has been described with reference to example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A method of operating a driver assistance system of a motor vehicle, said system having at least one surroundings sensor, a processing circuit, an output device connected to said processing circuit and configured to produce an output perceivable by the driver of said motor vehicle, and an input device connected to said processing circuit and configured to register an input from a driver of said motor vehicle, wherein said method comprises the steps:
   a) using said at least one surroundings sensor, detecting objects in a surrounding environment of said motor vehicle and producing sensor signals indicative of said detected objects;
   b) in said processing circuit, evaluating said sensor signals and producing a respective object information including an identification and/or an object characteristic of at least one respective target object among said detected objects;
   c) in said processing circuit, determining a respective confidence value representing a probability of accuracy for said identification and/or said object characteristic of said at least one target object respectively;
   d) in said processing circuit, comparing said respective confidence value to a prescribed threshold;
   e) if said respective confidence value in said step d) falls below said prescribed threshold then producing as said output from said output device a driver information comprising said respective object information; and
   f) after said step e), using said processing circuit, checking an input status of said input device, and if said input status indicates confirmation of said respective object information by the driver then performing or continuing to perform a driver assistance function of said driver assistance system based on said respective object information.

2. The method according to claim 1, wherein said step f) further comprises, if said input status of said input device indicates non-confirmation of said respective object information by the driver then discontinuing or not performing said driver assistance function based on said respective object information.

3. The method according to claim 1, further comprising, after said step c), an additional step comprising comparing said respective confidence value to a minimum threshold and proceeding to said step d) only if said respective confidence value exceeds said minimum threshold.

4. The method according to claim 1, further comprising, before said step d), a further step of checking whether an already-active driver assistance function of said driver assistance system is already being performed based on said respective object information or based on other object information regarding a different target object among said detected objects.

5. The method according to claim 4, wherein said step d) is carried out with a first active-system threshold value as said prescribed threshold if said further step determined that said already-active driver assistance function is already being performed, said step d) is carried out with a second inactive-system threshold value as said prescribed threshold if said further step determined that no said already-active driver assistance function is already being performed, and said first active-system threshold value is less than said second inactive-system threshold value.

6. The method according to claim 4, wherein if said further step determined that no said already-active driver assistance function is already being performed and said respective confidence value in said step d) falls below said prescribed threshold, then further comprising beginning to perform said driver assistance function based on said respective object information even before said input status of said input device indicates said confirmation of said respective object information by the driver.

7. The method according to claim 6, wherein if said step f) determined that said input status indicates said confirmation then continuing to perform said driver assistance function, and if said step f) determined that said input status indicates non-confirmation of said respective object information by the driver then discontinuing said driver assistance function that had been begun.

8. The method according to claim 4, wherein if said further step determined that said already-active driver assistance function is already being performed and said respective confidence value in said step d) falls below said prescribed threshold, then if said step f) determined that said input status indicates said confirmation then continuing to perform said already-active driver assistance function, and if said step f) determined that said input status indicates non-confirmation of said respective object information by the driver then discontinuing said already-active driver assistance function.

9. The method according to claim 1, wherein said respective object information includes a plurality of object characteristics of said respective target object and/or said step b) comprises producing a plurality of said respective object informations respectively for a plurality of said respective target objects, said driver information produced as said output in said step e) comprises said plural object informations and/or said plural object characteristics, in said step f) said input status indicates confirmation of at least a particular selected one of said plural object informations that has been selected by the driver via said input device and/or confirmation of at least a particular selected one of said plural object characteristics that has been selected by the driver via said input device, and in said step f) said driver assistance function is based on said particular selected object information and/or said particular selected object characteristic.

10. The method according to claim 1, wherein if said respective confidence value in said step d) equals or exceeds said prescribed threshold, then further comprising automatically performing or continuing to perform said driver assistance function of said driver assistance system based on said respective object information.

11. The method according to claim 1, wherein said driver assistance system comprises a lane recognition system, said object information includes a detected lane course of a roadway lane determined by said processing circuit in said evaluating in said step b), and in said step f) if said input status indicates confirmation of said detected lane course by said driver then said detected lane course is used as a correct recognized lane course in said object information as a basis of said driver assistance function.

12. The method according to claim 11, wherein said driver assistance function is a lane departure warning function, a lane departure avoidance function, a lane keeping assistant function, or a lane changing assistant function, which is performed based on said correct recognized lane course.

13. The method according to claim 1, wherein said driver assistance system comprises an adaptive cruise control system which can perform an object following control as said driver assistance function, said target object is one of said detected objects that is traveling ahead of said motor vehicle in a same roadway lane as said motor vehicle, and said driver assistance function of said step f) is said object following control to follow said target object.

14. The method according to claim 1, wherein said driver assistance system comprises an adaptive cruise control system which is performing an object following control to follow a previously recognized object, said target object is a new recognized object among said detected objects that is traveling ahead of said motor vehicle, and if said input status in said step f) indicates said confirmation by the driver of said respective object information regarding said new recognized object then said step f) comprises discontinuing said object following control to follow said previously recognized object and instead performing an object following control to follow said new recognized object.

15. The method according to claim 1, wherein said driver assistance system comprises a lane recognition assistant system that can perform a lane related function selected from a lane recognition function, a lane departure warning function, a lane departure avoidance function, a lane changing assistant function and/or a lane keeping assistant function as said driver assistance function, said driver information comprises a display of a detected lane course, if said input status indicates confirmation of said detected lane course by the driver then said step f) comprises performing or continuing said lane-related function based on said detected lane course, and if said input status indicates non-confirmation of said detected lane course by the driver then said step f) comprises discontinuing said lane-related function.

16. The method according to claim 1, wherein said driver assistance system is able to perform plural different driver assistance functions, said driver information produced in said step e) further comprises an indication of at least one particular proposed function among said plural different driver assistance functions, and if said input status further indicates confirmation of said proposed function, then said step f) comprises performing or continuing to perform said proposed function based on said respective object information.

17. The method according to claim 1, further comprising switching said driver assistance system to a safe condition if said input status indicates that said input device has not been actuated by the driver during a prescribed time duration.

18. The method according to claim 1, further comprising emitting a warning to the driver if said input status indicates that said input device has not been actuated by the driver during a prescribed time duration.

19. A method of operating a driver assistance system of a motor vehicle with at least one driver assistance function, in which objects and or object characteristics of recognized objects in the detection zone of surroundings sensors of the driver assistance system have a confidence value (P) allocated thereto, which indicates the probability of the existence of the detected object and/or the probability of the proper allocation of the object characteristic to the recognized object, characterized in that if the confidence value (P) of a detected object or at least one object characteristic of a recognized object falls below a prescribed threshold value ($S_A$, $S_I$), then a driver information is produced by a display unit, the driver information contains the informations regarding the detected object and/or at least one object characteristic of the recognized object, by actuation of an operating arrangement, the detected object and/or the at least one object characteristic of the recognized object is confirmable by the driver, and upon a confirmation of the detected object and/or the at least one object characteristic of the recognized object by the driver, then the driver assistance system performs the at least one driver assistance function on the basis of the confirmed object and/or the confirmed object characteristic of the recognized object, or if the driver assistance function is already being performed then this driver assistance function is further performed.

* * * * *